June 4, 1946.    E. F. LAZAR    2,401,358
ANTIFEEDBACK CIRCUIT SYSTEM
Filed May 8, 1941
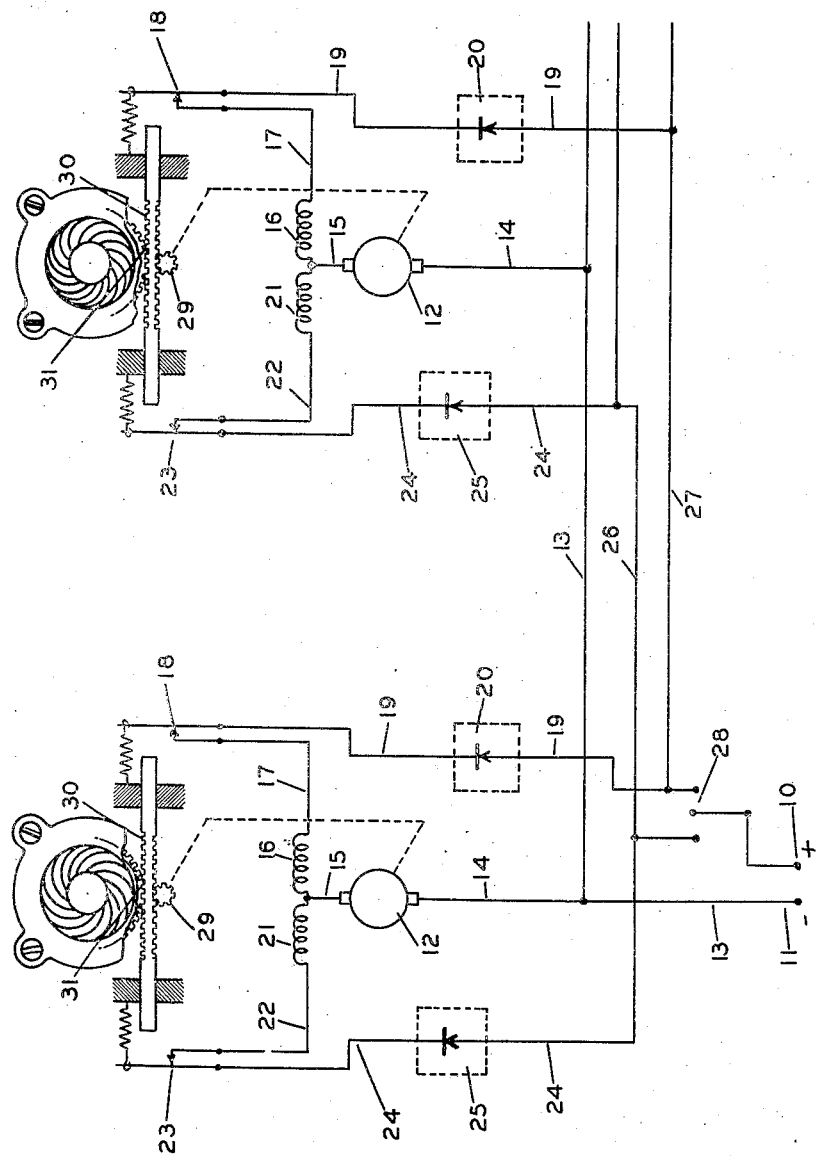
INVENTOR
EDWARD F. LAZAR,
BY
Herbert H. Thompson
HIS ATTORNEY.

Patented June 4, 1946

2,401,358

UNITED STATES PATENT OFFICE 2,401,358

ANTIFEEDBACK CIRCUIT SYSTEM

Edward F. Lazar, Crestwood, N. Y., assignor to Sperry Gyroscope Company, Inc., Brooklyn, N. Y., a corporation of New York Application May 8, 1941, Serial No. 392,510

10 Claims. (Cl. 172—239)

This invention relates to an antifeedback current system or circuit, and, in particular, pertains to the electrical arrangement of such a system by which a plurality of reversibly operable motors are controlled within their respective ranges of operation or at their respective limiting positions without feedback or one affecting the operation of the other.

One of the features of the invention consists in the provision of a circuit or system for a plurality of reversibly and simultaneously operable electric motors, controlled within defined limits of operation by limit switches which system includes a number of unidirectional current flow devices in the motor circuits of the system by means of which a feedback current therein is prevented.

Other features and structural details of the invention will be apparent from the following description when read in connection with the accompanying drawing, wherein the single figure illustrates a wiring diagram showing how the present inventive concepts may be embodied for use to control the operation of the iris shutters of a group of searchlights. The illustrated limit switch system for controlling the operation of the reversible motors may obviously be employed to regulate a number of valves or other devices in a similar manner.

With reference to the drawing, a suitable source of power, preferably of direct current, is applied to poles or terminals 10 and 11 to drive the respective motors of the antifeedback system. As shown, 10 represents the positive or feed circuit pole for the employed direct current input to the system and 11 is the negative or return circuit pole or terminal. The reversibly operative electric motors of the system are designated at 12, only two of the same being shown in the drawing although clearly any desirable number of such motors may be employed.

Preferably each of the motors 12 is made reversible by the provision of alternately energized reversing fields 16 and 21 whereby each motor 12 will rotate in a direction corresponding to the particular field 16 or 21 energized. One terminal of each motor 12 is connected as by a lead 14 to a common return lead 13 and thereby to one terminal, such as the negative terminal 11, of the direct current source. The other terminal of each motor 12 is connected to the junction of its respective field windings 16 and 21 as by a conductor 15. Each right-hand field winding 16 (as viewed in the drawing) is connected by a lead 17 to one terminal of a normally closed limit switch 18 whose other terminal is connected by a lead 19 to the common feed circuit 27 of the system hereinafter described. In each of the leads 19 for the respective motors 12 is located a unidirectional current flow device, as designated at 20, the purpose of which is to prevent a feedback of the current in any of the motor circuits of the system as will hereinafter be described in more detail. The limit switch 18 and unidirectional current flow device 20 in the motor circuit described are arranged in series with the field winding 16 of the respective motors 12. A similar circuit is provided for the respective field windings 21 and includes common lead 15, the reversing field winding 21, lead 22, normally closed limit switch 23, and lead 24 which includes the unidirectional current flow device 25, lead 26 connecting with switch 23 and the common supply lead 26. As shown, the unidirectional current flow devices 20 and 25 permit the flow of current to the motors through either switch 18 or 23, respectively, and prevent the flow of current from either of the limit switches towards the supply line. The unidirectional current flow devices employed in the instant case are rectifiers of the copper oxide type.

The common feed circuits are indicated at 26 and 27, the leads 24 for the respective motor circuits being connected to circuit 26 and the motor circuit leads 19 being connected to circuit 27. A two-way switch 28 which has a central terminal connected to the positive terminal 10 of the power source forms a means for energizing one of the common feed circuits 26 or 27 at a time from the current source 10, 11 so that the system effects simultaneous operation of the motors 12 either in one or the other of its directions of rotation depending on the closed position of switch 28.

In the embodied form of the invention shown, the respective motors 12 rotate the pinions 29 so that the slidably mounted racks 30 meshing therewith simultaneously move either to the right or left as viewed in the drawing, within the limits permitted by the respective limit switches 18 and 23, depending upon which way the switch 28 has been closed. The illustrated large gears 31 also meshing with the racks 30 are consequently moved in this instance to obtain the desired openings in the respective iris shutters for the searchlights. The degree of operation in either direction of the motors is limited by the movement of the racks 30 when either switch 18 or 23 is opened and the motor circuit broken, the ends of the racks in this event abutting against the movable arms of the respective switches to obtain this result.

The rectifiers 20 and 25 are provided in the system to prevent a feed back current in any portion of the circuit system due to the opening of corresponding limit switches 18 or 23 at different time intervals. For example, assuming that switch 28 is moved to the right, as viewed in the drawing, and no rectifiers are employed, the feed circuit 27 is energized from the power supply, current then flowing through leads 19, closed switches 18, leads 17, windings 16, motors 12, leads 14 and back to the return circuit 13 to the negative terminal 11 of the power supply. This operates the motors 12 to simultaneously move the respective racks 30 toward the right, as viewed in the drawing. If this operation continues and the limit switch 18 for the left-hand motor, for example, opens before the one illustrated at the right does, current flows through the closed right switch 18, lead 17, windings 16 and 21, lead 22, right limit switch 23, lead 24, open feed circuit 26, lead 24 to left limit switch 23 for the left-hand motor, which closes the circuit through the left motor by way of lead 22, winding 21, lead 14 to the negative pole or terminal 11. This causes reversal in the direction of operation of the left-hand motor 12 which moves the rack 30 so that the switch 18 is permitted to close, which action again reverses the direction of the operation of the considered motor. Undesirable oscillation of the gear 31 controlled by this motor is consequently obtained. With the rectifiers 25 in the system such feedback current in the open feed and motor circuit of the system is prevented.

When switch 28 is moved to the left, as viewed in the drawing, the feed circuit 26 is energized so that the respective motors 12 operate to move the racks 30 towards the limit switches 23, and a similar operation is produced.

While I have described what I consider to be a highly desirable embodiment of my invention, it is obvious that many changes in form could be made without departing from the spirit of my invention, and I, therefore, do not limit myself to the exact form herein shown and described, nor to anything set forth, and as hereinafter claimed.

I claim as my invention:

1. In an antifeedback current system, the combination of a power source, a plurality of reversibly operable electric motors, each motor having separate fields in different circuits for opposite directions of rotation, a pair of double motor circuits having a common return to the source, one of said motor circuits including one field of each motor for effecting simultaneous operation of the motors in one direction and the other motor circuit including one field of each motor for effecting operation thereof in the opposite direction, normally closed limit switches controlled by said motors by which the respective motor circuits are opened after a predetermined degree of operation of the motors in either direction, a unidirectional current flow device in each of the double motor circuits by which a feedback current in any of the respective motor circuits is prevented, a common feed circuit for each of the double motor circuits, and selective means for closing one of the feed circuits to the source.

2. In an antifeedback current system, the combination of a power source, a plurality of reversibly operable electric motors, a common return circuit for the motors to the source, a double motor circuit arrangement for each of the motors, each of which includes a field winding for determining the direction of operation thereof and by which simultaneous operation of the motors in either one or the other of their directions of rotation are effected, normally closed limit switches controlled by said motors in each of said double motor circuits by which the respective circuits are opened after a predetermined degree of operation of the motors, a rectifier in each of said double motor circuits by which a feedback current therein, due to the opening of corresponding limit switches at different intervals, is prevented, a common feed circuit for each of the double motor circuits, and a switch by which either common feed circuit is selectively closed to the power source.

3. In an antifeedback current system, the combination of a direct current source, a plurality of reversibly operable electric motors, a common return circuit for the motors to the source, a double motor circuit arrangement for each of the motors in the system, one of said motor circuits effecting simultaneous operation of the motors in one direction and the other effecting operation thereof in the opposite direction, normally closed limit switches controlled by said motors in each of said double motor circuits by which the respective circuits are opened after a predetermined degree of operation of the motors in either direction, a copper oxide rectifier in each of the double motor circuits of the system by which a feedback current therein, due to the opening of corresponding limit switches at different intervals, is prevented, a common feed circuit for each of the double motor circuits, and a switch by which either common feed circuit is selectively closed to the source to desirably control the operation of the motors.

4. A circuit arrangement for preventing feedback of current therein between a plurality of electric motors operated from a common source, comprising, a plurality of series motors, each of which includes a pair of field windings connected at one end to the armatures thereof, by which the direction of operation of the motors is reversed, a source of direct current, a connection from one pole of said source to an armature terminal of each of said motors, a switch for selectively connecting the field windings of said plurality of motors to said source and to cause similar operations thereof, a limit switch in series with each field winding and actuated by the motors after a predetermined degree of operation thereof between defined limits, and a unidirectional current flow device in series with each field winding for preventing reversal of current therethrough.

5. A motor control circuit for a plurality of reversing field reversible motors comprising a source of electrical power, means for connecting one terminal of each of the armatures of said motors to one terminal of said source, means for connecting the other terminal of each of said armatures to both of its respective reversing fields, means for connecting the opposite terminals of those reversing fields producing a predetermined sense of motor rotation to a common lead, means for connecting the opposite terminals of the remaining reversing fields to a second common lead, means for selectively connecting either of said leads to the other terminal of said source, whereby all said motors may be simultaneously rotated in one or the other direction, and means for preventing feed-back of energy from said connected common lead to said other common lead.

6. A motor control circuit as in claim 5, wherein said last-named means comprises a uni-directional conducting device connected in series with each of said fields.

7. A motor control circuit for a plurality of reversible motors, each having two field windings whose respective energization produce respective directions of motor rotation, comprising means for connecting all said windings producing corresponding respective senses of rotation to respective common leads, means for selectively energizing one or the other of said leads to thereby cause rotation of all said motors in a corresponding sense, and means for preventing feedback of energy from an energized lead to an unenergized lead.

8. A motor control circuit as in claim 7, wherein said last named means comprises a unidirectional conducting device connected in series with each of said fields.

9. A motor control circuit comprising a plurality of reversible motors, each with two fields for effecting rotation in opposite directions, means for energizing said motors, each through one or the other of its fields, a pair of limit switches for each motor connected to interrupt energization of said motor upon exceeding a predetermined rotation in a respective direction, and means connected in circuit with each motor field for preventing feed-back of energy from another motor in response to actuation of one of said limit switches.

10. A motor control circuit comprising a plurality of reversible motors, means for energizing said motors, a pair of limit switches for each motor connected to interrupt energization of said motor upon exceeding a predetermined rotation in a respective direction, each of said motors comprising two opposed field windings with unidirectionally conducting devices connected in series with each of said field windings for preventing feedback of energy from another motor.

EDWARD F. LAZAR.